United States Patent [19]

Morishita

[11] 3,967,791
[45] July 6, 1976

[54] SPINNING REEL FOR FISHING
[75] Inventor: Yasomatsu Morishita, Kure, Japan
[73] Assignee: Ryobi, Ltd., Hiroshima, Japan
[22] Filed: June 23, 1975
[21] Appl. No.: 589,190

[30] Foreign Application Priority Data
June 25, 1974  Japan............................ 49-75078[U]

[52] U.S. Cl............................................ 242/84.21 R
[51] Int. Cl.².......................................... A01K 89/02
[58] Field of Search................. 242/84.2 R, 84.2 A, 242/84.21 R, 84.21 W, 84.5 R, 84.53

[56] References Cited
UNITED STATES PATENTS
2,777,645    1/1957    Wood............................ 242/84.21 R Primary Examiner—Charles A. Ruehl

[57] ABSTRACT

A spinning reel for fishing including a reel body, a reel shaft, a rotor, a spool, a reciprocation mechanism, a handle, a handle box connected with the handle, a drag knob mounted on a pinion shaft supported in the handle box, a tubular handle shaft connected with the handle box and rotatably supported by the reel body and carrying a plate-like portion and an extended cylindrical portion in the reel body, a drag shaft disposed in the tubular handle shaft and extended at its outer end into the handle box to be slidable through a gear screwed on the drag shaft and a pinion formed on the pinion shaft, a master gear mounted around the cylindrical portion to rotate therewith, a drag washer having a central hole and also mounted on the cylindrical portion to hold the master gear between it and the plate-like portion and being axially slidable, the inner end of the drag shaft being extended through the central hole of the drag washer and provided with a head portion at the extended end, and a spring washer interposed between the head portion and the drag washer.

8 Claims, 2 Drawing Figures

SPINNING REEL FOR FISHING

BACKGROUND OF THE INVENTION

This invention relates to a spinning reel for fishing.

The conventional spinning reels for fishing which have reciprocating movements comprise a main body supporting a main shaft, a spool supported on the main shaft, a rotor rotated by a handle assembly for winding the line on the spool, and a drag mechanism arranged to allow a rotation of the spool with friction between the spool and a spool seat when excess tension builds up on the line. A drag knob of the drag mechanism is threadedly secured onto the front end of the main shaft to exert adjustable pressure against the forward spool and to produce a braking effect thereon by turning the knob. However, according to such conventional spinning reels, when turning the drag knob in front of the spool to adjust the braking effect on the spool, the angler must do so by changing his hand holding the handle, so that this operation is very troublesome. Also, in such drag mechanism, a drag knob is so secured directly to the main shaft that it is hard to exercise fine adjustment and it is hardly possible to make fine adjustments in the tension that is applied to the line when landing a fish.

An object of the present invention, therefore, is to provide a spinning reel for fishing in which the drag knob is provided at the handle portion to allow the angler to perform with ease the drag knob operation while holding the handle, that is, with no need of switching his hands for handling the drag knob.

Another object of the present invention is to provide a spinning reel for fishing in which a gear is disposed between the axis of the drag knob and the drag shaft to allow smooth and light drag knob handling as well as fine adjustment with ease.

The other objects and advantages of the present invention will become apparent from the following detailed description of a preferred embodiment of the invention as taken in conjunction with the accompanying drawings, in which:

DETAILED DESCRIPTION OF THE INVENTION

Figure 1:
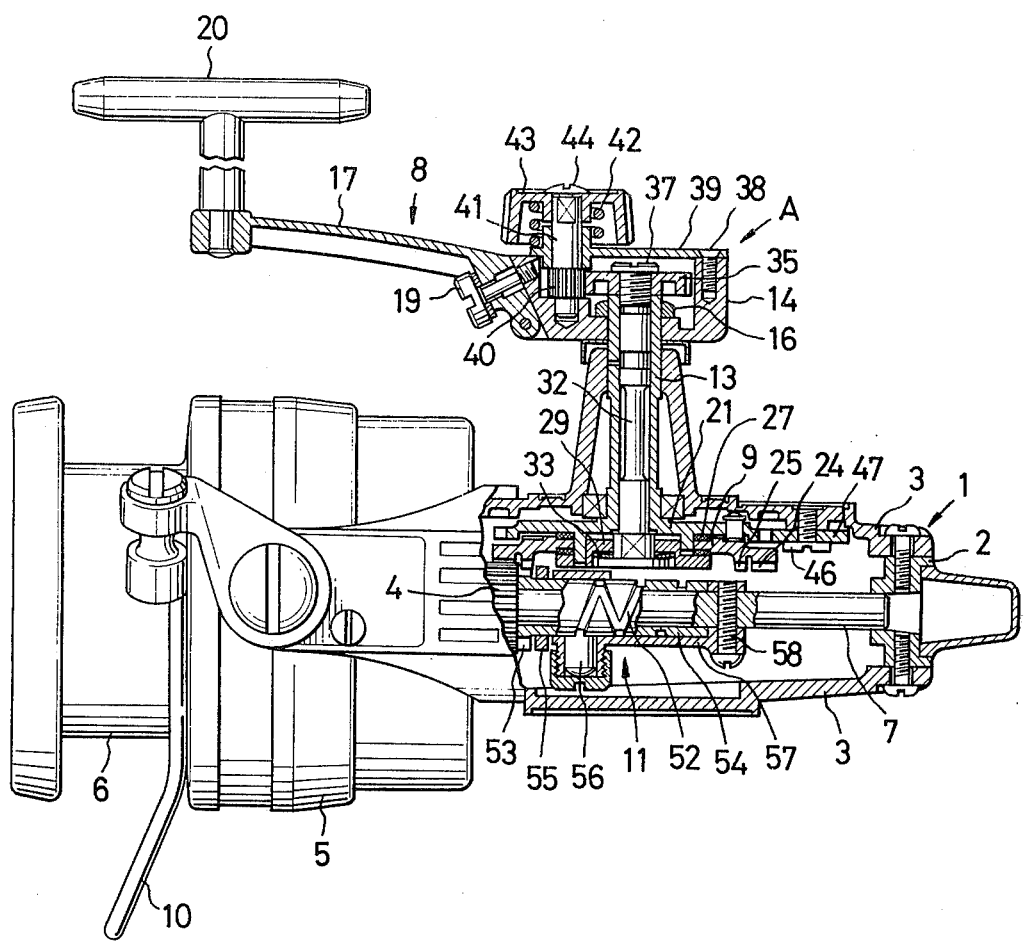
FIG. 1 is a transverse sectional view, with parts cut away, of a spinning reel according to the present invention.

Referring to FIG. 1, reference numeral 1 designates a reel body comprising a main body 2 and side plates 3 and designed to rotatably support a rotor 5 through a tubular shaft (not shown) around which is formed a pinion 4. Slidably fitted in the tubular shaft is a main shaft 7 which carries a spool 6 at it one end. The pinion 4 is meshed with a master gear 9 rotated by a handle 8 so as to rotate the rotor 5. The main shaft is arranged capable of making reciprocating movements by the operation of a reciprocation mechanism which will be described in detail later, so that the fishline passed round a bell arm 10 will be uniformly wound on the spool 6.

Figure 2:
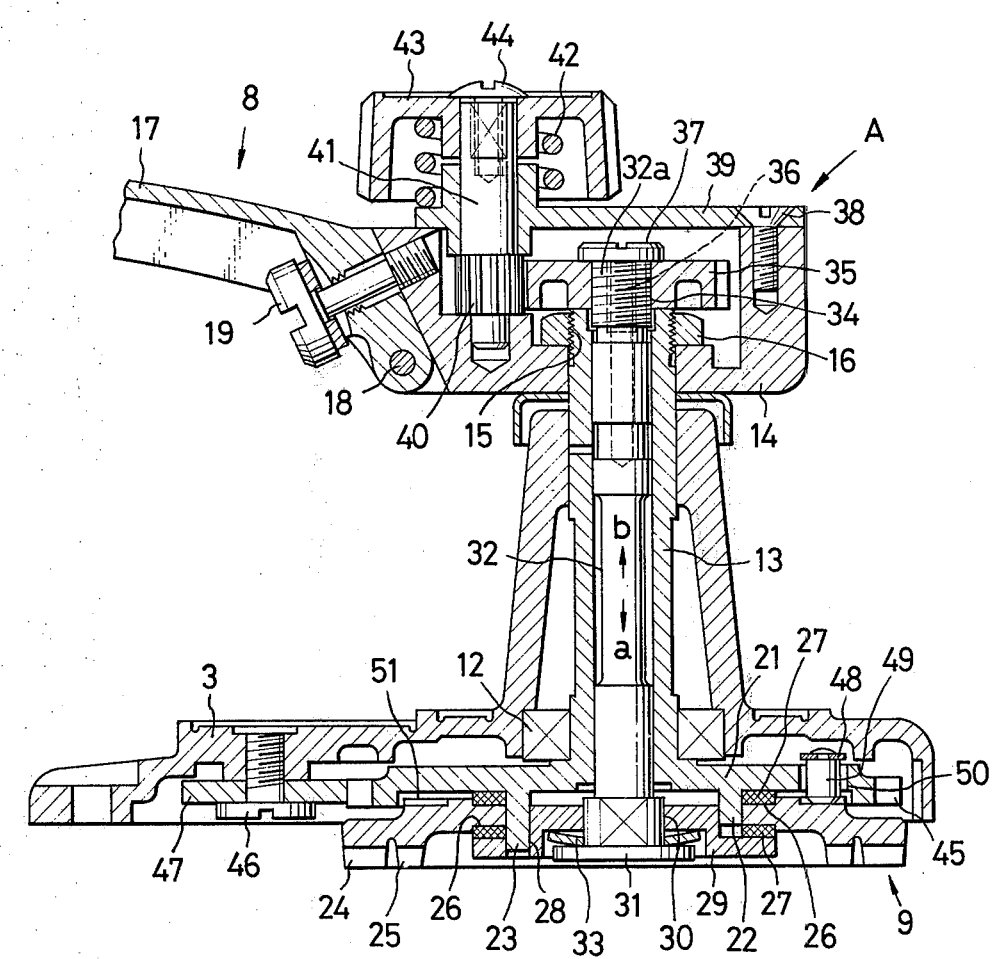
FIG. 2 is an enlarged sectional view of the handle and drag mechanism in the spinning reel.

As shown in FIG. 2, the handle 8 is secured at its end to a handle box 14 which is in turn secured, by a nut 16, to the external threaded portion 15 at the outer end of a tubular handle shaft 13 rotatably supported by side plate 3 through a bearing 12. The handle arm 17 having a knob 20 at its one end is pivotted at 18 to one side of said handle box and also threadedly secured thereto by a set screw 19.

Letter A designates a drag mechanism provided adjacent to the handle 8.

The inner end of the handle shaft 13 terminates into a plate-like portion 21 carrying an extended cylindrical portion 22 concentric with the tubular handle shaft. On the annular front end face of the cylindrical portion are provided at least two suitably spaced-apart lobes 23. Master gear 9 comprises a first annular gear 24 and a second annular gear 25 arranged concentric with each other on the same side and rotatably fitted onto the cylindrical portion 22. On both obverse and reverse sides of the inner peripheral edge of master gear 9, there are formed annular recesses 26 in which washers 27 having a greater thickness than the depth of the annular recesses 26 are fitted to serve as a sliding clutch. Fitted in the cylindrical portion 22 of the handle shaft 13 is a drag washer 29 formed with holes 28 corresponding to and for receiving the lobes 23. This drag washer 29 is adapted to hold the master gear 9 between the washer and the plate-like portion 21 in cooperation with the washers 27.

The drag washer 29 has a central hole 30 and is offset an amount approximately equal to its thickness at its periphery. A drag shaft 32 having its inner end contoured to conform with the central hole and provided at the end with a head portion 31 is disposed in the tubular handle shaft 13 and also fitted in the central hole 30 of the drag washer 29 so that the drag shaft won't rotate. Disposed between the head portion 31 and the drag washer 29 is a spring washer 33 which provides a resilient tensile force acting to pull the drag shaft 32 in the direction of arrow a. The outer end of the drag shaft 32 extends from the outer end of the tubular handle shaft 13 into the handle box 14, and the extended end thereof is provided with an external thread 32a meshed with the corresponding internal thread 34 of a gear 35. In the outer end face of the drag shaft is formed a threaded hole 36 in which a screw 37 is threadedly fitted to prevent removal of the gear 35. Handle box 14 has its opening closed by a cover 39 secured in position by a screw 38 and houses the gear 35 therein. A drag pinion 40 is formed on a shaft 41 supported rotatable by a two-point support provided by the cover 39 and handle box 14, and is meshed with the gear 35. A drag knob 43 is fixed to the outer end of the drag pinion shaft 41 by a screw 44, and a compressed spring 42 is interposed between the drag knob and handle box 14 to inhibit free turn of the drag knob. The drag knob is outwardly provided on handle box 14 and is positioned substantially at the proximal end of the handle arm 17, thus allowing the angler to handle the drag knob while gripping the handle knob 20.

The plate-like portion 21 of the tubular handle shaft is formed at its periphery with a gear 45 which is meshed with a pawl 47 pivotted to the plate 3 by a screw 46. A terminal 49 supported by a clip spring 48, extends through a hole 50 in the plate-like portion 21 and engages in between protuberances 51 provided suitably spaced apart from each other and radially outward on the back side of the master gear 9.

The reciprocation mechanism 11 is constructed as follows. That is, as shown in FIG. 1, an oscillator 54, provided with a traverse cam groove 52 in its external surface and also externally formed with a pinion 53 at its one end, is rotatably mounted on the main shaft 7 such that its axial movement is prevented by a check ring 55. The oscillator 54 is rotated about the main shaft 7 with rotation of the master gear 9 as the pinion 53 is meshed with the second gear 25 of the master gear. An oscillating slider 57 provided with an engaging member 56 on its peripheral wall is incorporated in the oscillator and fixed to the main shaft 7 by a screw 58. The slider is also supported to the body 1 so as to be nonrotatable but slidable relative to the body, with the engaging member 56 being engaged in the traverse cam groove 52. It will be also seen that the first gear 24 is meshed with the pinion 4.

Now the action and effect of the present spinning reel having the just described arrangements is described.

When the handle 8 is turned, the master gear 9 carried on the tubular handle shaft 13 is also turned to cause corresponding rotation of the rotor 5 through the pinion 4, whereby the oscillator 54 is also turned through the pinion 53 to cause the slide movements of the main shaft 7 through the oscillating slider 57 by the engaging member 56 which fits in the traverse cam groove 52, and this urges the axial sliding movements of the spool 6 to uniformly wind up the line on the spool. In the spinning reel of the present invention, the drag mechanism and its drag knob 43 are disposed close to the handle, so that when excess tension develops in the line during landing of a fish, the angler turns the drag knob while gripping the handle knob to correspondingly turn the gear 35 so as to move the drag shaft 32 in the axial direction to adjust the engagement pressure of the master gear 9 through the spring washer 33 and the drag washer 29 to thereby adjust frictional resistance of the parts, thus producing uniform winding of the line in conformity to the tug on the line by the fish caught.

According to the drag mechanism A of the present invention, when the threadedly engaged position of the gear 35 is changed through the pinion 40 by turning the drag knob, the drag shaft 32 is moved either in the direction of arrow *a* or in the direction of arrow *b* as the gear abuts against the end face of the tubular handle shaft 13, and thereby the amount of deformation of the spring washer 33 is adjusted. Also, the force acting on the drag washer 29 is changed to adjust the pressing force on the master gear, thereby adjusting friction between the master gear 9 and the plate-like portion 21 of the tubular handle shaft through the washer 27. Therefore, if the gear 35 is moved to the body side by turning the drag knob, the drag washer 29 is pressed stronger against the master gear through the spring washer 33 to enlarge the coefficient of friction. On the other hand, if the gear 35 is moved in the opposite direction, the drag shaft is now pulled in the direction of arrow *a* by the spring washer 33, whereby frictional engagement of the master gear by the drag washer 29 is lessened to reduce the coefficient of friction to increase the slide of the master gear. The present invention can employ other known reciprocation mechanisms than the above-said mechanism 11, and in this case, too, the said objects and effects can be attained similarly.

As described above, the spinning reel according to the present invention can drastically improve controllability of the drag mechanism in the reel to allow delicate action by the angler to the tug on the line, thus doubling the joy of fishing.

What is claimed is:

1. A spinning reel for fishing comprising a master gear rotated by a handle, a pinion formed on a tubular shaft to mesh with said master gear, the pinion being arranged to rotate a rotor supported by a reel body, a main shaft carrying a spool at its one end and inserted in said tubular shaft, the main shaft being interlocked with said master gear through a reciprocation mechanism, a tubular handle shaft rotatably supported in said reel body and having at its inner end a plate-like portion carrying an integral extended cylindrical portion, a handle box fixed to the outer end of said tubular handle shaft and connected with a handle, a cover closing an opening of said handle box, said master gear having a central aperture and being rotatably mounted on said cylindrical portion together with washers, a drag washer also mounted on said cylindrical portion so as to be rotatable therewith and also slidable axially and adapted to hold said master gear between it and said plate-like portion, a drag shaft fitted in a central hole of said drag washer so as to be unrotatable and inserted in said tubular handle shaft, a spring washer interposed between a head portion provided at the inner end of said drag shaft and said drag washer, a gear threadedly screwed on the outer end of said drag shaft, a drag pinion shaft rotatably supported in said handle box and through said cover, a drag pinion formed on said pinion shaft and meshed with said gear, and a drag knob fixed to the outer end of said pinion shaft.

2. A spinning reel for fishing according to claim 1, wherein said master gear comprises a first annular gear and a second annular gear arranged concentric with each other on the same side, and is provided with annular recesses on both obverse and reverse sides of the inner peripheral edge of said central aperture.

3. A spinning reel for fishing according to claim 2, wherein said annular recesses are respectively fitted with washers having a greater thickness than the depth of the recesses.

4. A spinning reel for fishing according to claim 1, wherein said extended cylindrical portion of the tubular handle shaft is provided with at least two lobes on the annular front end face thereof.

5. A spinning reel for fishing according to claim 4, wherein said drag washer has at least two holes corresponding to and for receiving said lobes.

6. A spinning reel for fishing according to claim 1, wherein said plate-like portion of the tubular handle shaft is formed at its periphery with a gear meshed with a pawl pivotted to said reel body, and has a hole through which a terminal extends to engage in between protuberances provided radially and spaced apart from each other on the back side of said master gear.

7. A spinning reel for fishing according to claim 1, wherein the outer end of said drag shaft is extended from the outer end of said tubular handle shaft into said handle box and has a threaded hole in the outer end face thereof to receive a screw therein.

8. A spinning reel for fishing according to claim 1, wherein said reciprocation mechanism includes an oscillator rotatably mounted on said main shaft such that its axial movement is prevented by a check ring, the oscillator being provided with a traverse cam groove in its external surface and externally formed at its one end with a pinion meshed with said master gear, an oscillating slider incorporated in said oscillator and fixed to the main shaft, the oscillating slider being provided on its peripheral wall with an engaging member engaged in said traverse cam groove.

* * * * *